(12) United States Patent
Olstad et al.

(10) Patent No.: US 6,874,071 B2
(45) Date of Patent: Mar. 29, 2005

(54) DATABASE COMMIT CONTROL MECHANISM THAT PROVIDES MORE EFFICIENT MEMORY UTILIZATION THROUGH CONSIDERATION OF TASK PRIORITY

(75) Inventors: Chad Allen Olstad, Rochester, MN (US); Gary Ross Ricard, Chatfield, MN (US)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 10/021,945

(22) Filed: Dec. 13, 2001

(65) Prior Publication Data

US 2003/0115429 A1 Jun. 19, 2003

(51) Int. Cl.[7] .............................................. G06F 12/00
(52) U.S. Cl. ..................... 711/158; 711/111; 711/154; 711/170; 707/2; 707/202; 705/35; 705/39; 705/42
(58) Field of Search ................................ 711/158, 111, 711/154, 170; 707/2, 202; 705/35, 39, 42

(56) References Cited

U.S. PATENT DOCUMENTS

| | | | | |
|---|---|---|---|---|
| 5,193,188 A | * | 3/1993 | Franaszek et al. ............. 707/8 |
| 5,504,894 A | * | 4/1996 | Ferguson et al. .............. 707/2 |
| 5,504,899 A | * | 4/1996 | Raz ............................ 707/10 |
| 5,504,900 A | * | 4/1996 | Raz ............................ 707/10 |
| 6,108,671 A | * | 8/2000 | Ogawa ...................... 707/204 |
| 6,442,631 B1 | * | 8/2002 | Neufeld et al. ............. 710/107 |
| 6,453,356 B1 | * | 9/2002 | Sheard et al. .............. 709/231 |
| 2002/0095301 A1 | * | 7/2002 | Villena .......................... 705/1 |

* cited by examiner

*Primary Examiner*—Stephen Elmore
(74) *Attorney, Agent, or Firm*—Steven W. Roth

(57) ABSTRACT

Disclosed is an enhanced database journaling mechanism that results in reduced secondary storage consumption. The memory management mechanism of the present invention reduces journal size, and accordingly, secondary storage utilization by monitoring the effects to the journal by certain transactions and by making one or more adjustments to reduce those effects.

14 Claims, 3 Drawing Sheets

DATABASE COMMIT CONTROL MECHANISM THAT PROVIDES MORE EFFICIENT MEMORY UTILIZATION THROUGH CONSIDERATION OF TASK PRIORITY

FIELD OF THE INVENTION

The present invention relates to data processing systems. More particularly, the present invention relates to database Commit Control Mechanisms.

BACKGROUND OF THE INVENTION

Computer systems are often thought of as extremely complicated devices that represent unfathomable complexity. While this may be true to some extent, computer systems, at the most basic level, involve only two main components, a component for handling and analysing data, called a "processor," and a component for storing information, which is aptly referred to as "memory." While this invention involves both of these main components, it is the memory component that most directly benefits from the advantages set forth in this patent.

Computer system memory can be broken down into two basic types. Main memory, also sometimes called primary memory, is used for direct access to the computer system's stored information by the computer system' processor. This type of memory is typically relatively fast to access, but generally small in size and expensive. Additionally, main memory is usually designed to be "volatile," meaning that its contents can be lost if the computer system is turned off (i.e., "powered down") or if a power failure occurs (e.g., during a utility interruption). Therefore, main memory is generally designed to provide for short-term access to certain information. The other basic type of computer system memory is referred to here as secondary storage; however, it is also sometimes called permanent storage, persistent storage, or simply "disk." As its names suggest, this type of memory is designed for long-term information storage. Accordingly, secondary storage tends to be relatively large, inexpensive, and slow.

To promote overall computer system performance, information is moved by the computer system back and forth between main memory and secondary memory in a way that allows the processor to access needed information from the smaller, faster main memory rather than from the larger, slower secondary memory. While it is important to ensure that information does not continue to reside in main memory after its usefulness has ended, wasteful use of even the less expensive, secondary storage is problematic. One area in which there has been considerable focus in this regard is the database systems area. Database systems are used to store, organize, and access the computer's information (called data). While very powerful, database systems are also well known to be very compute-intensive, meaning that they are often said to "eat up" a large amount of the computer system's processor and memory resources. The advantages of this patent are directed to database system improvements that yield more efficient memory utilization, and particularly, more efficient secondary storage utilization.

One key database system mechanism is called a "journal" or "log." Fundamentally speaking, a journal is computer system file that is used to store changes to the database. As such, the journal can be thought of as a record of additions, updates, and deletions to the information contained in the database. Like many other computer system files, the journal is partially stored in main memory and partially stored in secondary storage. The portion stored in main memory is typically that portion which contains more recent database changes. This portion is typically fairly small. The portion located in secondary storage, however, can be very very large, and thus, can be enormously expensive to maintain. Therefore, it is important to limit the degree to which the journal consumes secondary storage.

A database concept that bears directly on journal size is the notion of a transaction. In database terminology, the journal is used to ensure that each transaction can be said to be atomic, which means that in the end a transaction must be completely reflected in the database or not at all. The journal is thus used as a trail of changes that can be reversed if all of the changes required by a given transaction do not occur successfully. One simple example of the importance of atomicity, is the standard banking transaction. When a customer makes a deposit at his or her bank, the transaction appears to the customer as a single step. To the computer, however, this simple transaction involves at least three steps. The appropriate database record must first be retrieved from the database, then updated to reflect the deposit, and finally stored again in the database. If the transaction is interrupted during any one of these three steps, it must be reversed, lest the customer be given the incorrect impression that the deposit was safely in their bank account when in reality it was not.

While this simple example can be used to explain the importance of atomicity, typical transactions are much more complex, often requiring significantly more time and steps. The situation is further complicated when one remembers that computer systems typically process many transactions at more or less the same time. It is easy to see, then, that more pending transactions means more time and steps, which means larger journal size, which in turn means additional secondary storage consumption. This is, of course, problematic for the computer system manufacturer because inefficient use of secondary storage equates to additional customer expense, which itself translates to lost sales.

SUMMARY OF THE INVENTION

Accordingly, a principal object of this invention to provide an enhanced database journaling mechanism that results in reduced secondary storage consumption.

It is another object of this invention to provide an enhanced database journaling mechanism that results in decreased journal space utilization by increasing transaction priority.

These and other objects of the present invention are accomplished by the enhanced memory management mechanism disclosed herein. The memory management mechanism of the present invention reduces journal size, and accordingly, secondary storage utilization by monitoring the effects to the journal by certain transactions and by making one or more adjustments to reduce those effects. In the preferred embodiment, this is accomplished by a commit control mechanism that monitors the elapsed time of outstanding transactions and adjusts the operating system priority of the job or jobs associated with older transactions so that those transactions are able to complete more quickly and thereby "free-up" previously used secondary storage space.

DESCRIPTION OF THE PREFERRED EMBODIMENT

Figure 1:
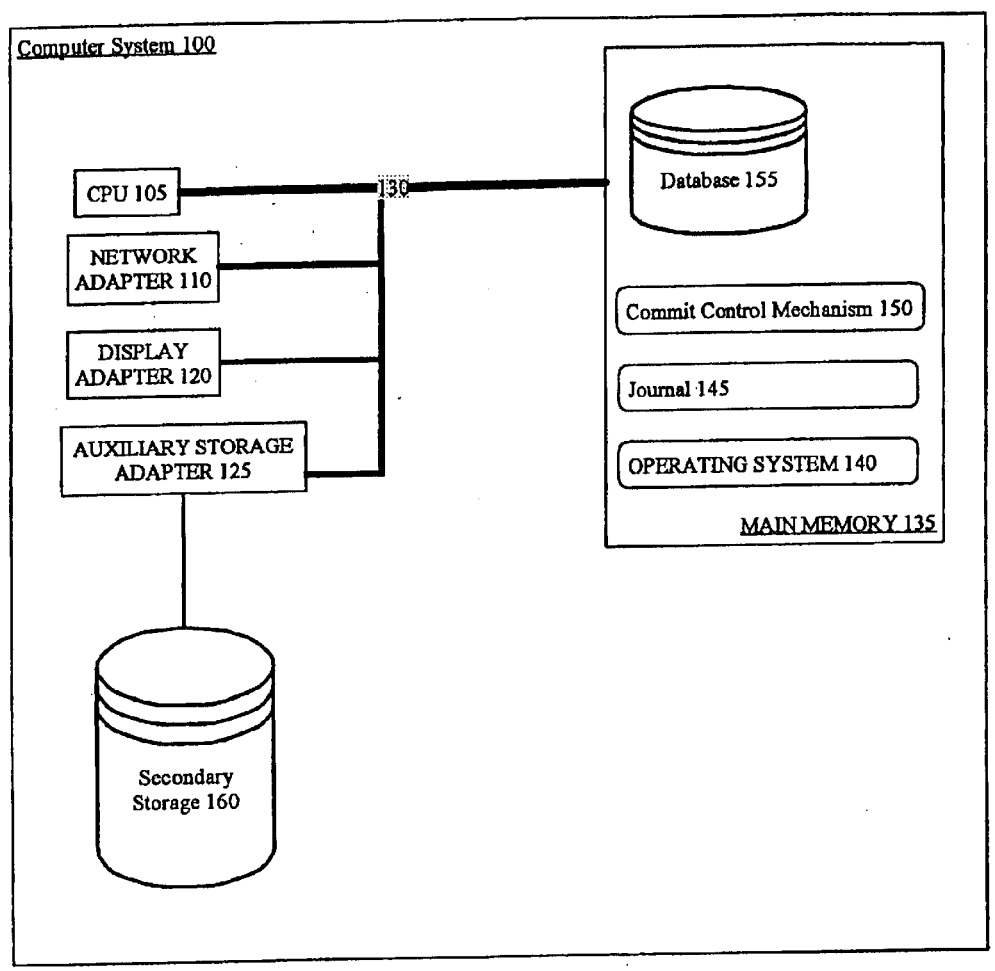
FIG. 1 is a block diagram of the computer system used in the preferred embodiment of the present invention.

Turning now to the drawings, FIG. 1 shows a block diagram of the computer system of the preferred embodiment of the present invention. The computer system of the preferred embodiment is an enhanced IBM eServer iSeries computer system. However, those skilled in the art will appreciate that the mechanisms and apparatus of the present invention apply equally to any computer system, regardless of whether the computer system is a complicated multi-user computing apparatus or a single user workstation. As shown in the exploded view of FIG. 1, Computer System 100 comprises main or central processing unit (CPU) 105 connected to Main Memory 135, Display Adapter 120, Auxiliary Storage Adapter 155, and Network Adapter 110. These system components are interconnected through the use of System Bus 130.

Computer System 100 utilizes well known virtual addressing mechanisms that allow the programs of Computer System 100 to behave as if they only have access to a large, single storage entity instead of access to multiple, smaller storage entities such as Main Memory 135 and attached Secondary Storage device 160. Therefore, while Database 155, Commit Control Mechanism 150, Journal 145, and Operating System 140 are shown to reside in Main Memory 135, those skilled in the art will recognize that these entities are not necessarily all completely contained in Main Memory 135 at the same time. (It should also be noted that the term computer system memory is used herein to generically refer to the entire virtual memory of computer system 100.)

Database 155 is that known in the industry as IBM DB2 for e Server iSeries, although other databases could be used. On the iSeries computer system of the preferred embodiment, Commit Control Mechanism 150 and Journal 145 are separate computer system entities, but those skilled in the art understand that Database 155, Commit Control Mechanism 150, and Journal 145 could all be combined into a single database management system (DBMS) without departing from the spirit and scope of the present invention. In the preferred embodiment, Commit Control Mechanism 150 operates by monitoring the duration of transactions being recorded in Journal 145 and by utilizing certain facilities of Operating System 140 to increase the priority of the job(s) associated with older transactions such that those transactions complete earlier than they otherwise would.

Operating System 140 is a multitasking operating system known in the industry as OS/400; however, those skilled in the art will appreciate that the spirit and scope of the present invention is not limited to any one operating system.

Network Adapter 110 is used to connect other computer systems and/or workstations to Computer System 100 in networked fashion.

Auxiliary Storage Adapter 125 is used to gain access to Secondary Storage Device 160 (i.e., to add, change, and delete information).

It is important to note that while the present invention has been (and will continue to be) described in the context of a fully functional computer system, the mechanisms of the present invention are capable of being distributed as a program product in a variety of forms, and there is no limitation as to the particular type of medium that can be used to actually carry out the program product-type distribution. The term signal bearing medium is used herein to denote different types of media that can be used for program product distribution. Examples of signal bearing media include: recordable type media such as floppy disks and CD ROMs and transmission type media such as digital and analog communications links.

Figure 2:
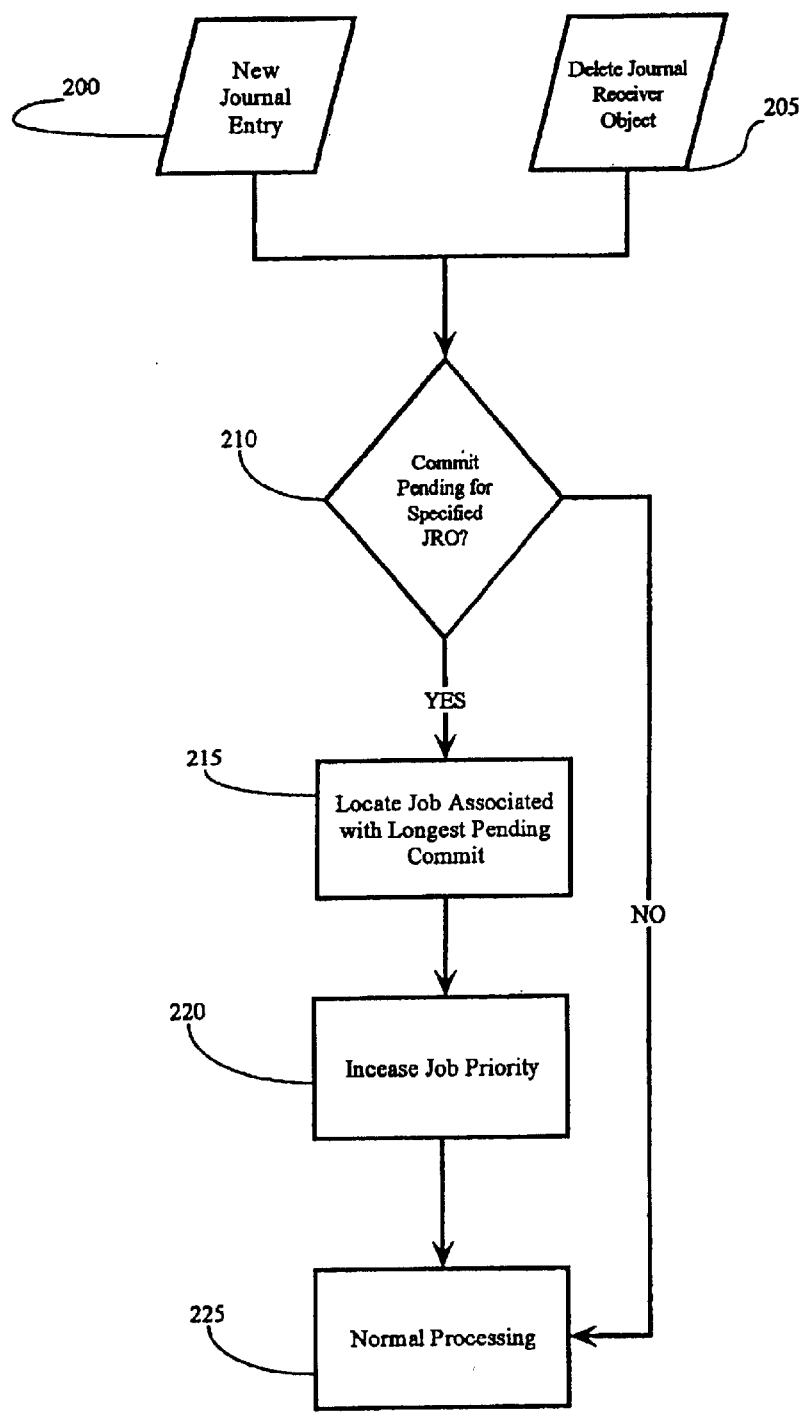
FIGS. 2 and 3 are flow diagrams that show steps used to carry out the commit control function of the preferred embodiment.

FIG. 2 is a flow diagram showing the steps performed by Commit Control Mechanism 150 to determine whether outstanding transactions require job priority adjustment. This inquiry is initiated when there is a request to create a new journal entry [block 200] or a request to delete what in the preferred embodiment is termed a journal receiver object (JRO) [block 205]. In the preferred embodiment, Journal 145 is a collection of these JROs. Essentially, a JRO represents a single unit of allocation for Journal 145. Thus, when Journal 145 is made larger (i.e., due to the need to add additional journal entries), an additional JRO is allocated in Main Memory 135 and then written to Secondary Storage Device 160. (In the preferred embodiment, the size at which a JRO is allocated varies depending upon the rate at which entries are being journaled. The benefits and advantages of the present invention are not, however, dependent upon a variable allocation scheme.). It should be noted here that any given JRO will likely contain journal entries for more than one transaction, and that a single transaction may very well have journal entries stored in more than one JRO. A key issue here is the fact that a JRO cannot be deleted from Secondary Storage Device 160 so long as one or more of its entries relate to an outstanding transaction. At the point in time when its entries no longer relate to an outstanding transaction, the JRO can be deleted from Secondary Storage Device 160. This can be accomplished directly by a user or system administrator or automatically through system-managed deletion, a facility of Computer System 100 of the preferred embodiment.

In block 210, Commit Control Mechanism 150 determines whether there are transactions requiring job priority adjustment (for the specified JRO) by determining whether there is one or more outstanding commit cycles pending. The term "commit," which denotes a well-known transaction processing operation, signals a successful end of a transaction. Thus, if a commit is pending, a transaction has yet to successfully complete, meaning that one or more JROs represent the particular transaction on Secondary Storage Device 160. In the preferred embodiment, this determination is accomplished by checking whether a commit use count is greater than zero. If so, at least one outstanding transaction exists and Commit Control Mechanism 150 proceeds to block 215 to locate the longest pending transaction. If Commit Control Mechanism 150 determines that a pending commit does not exist, normal processing continues in block 225.

If an outstanding transaction does exist, the longest pending transaction is identified in block 215. In the preferred embodiment, this is accomplished by examining a list of journaled commit blocks and choosing the transaction associated with the commit block having the earliest start-commit sequence number on the journal. Those skilled in the art will appreciate, however, that other mechanisms exist to determine the oldest outstanding transaction.

Once the oldest transaction has been identified, the priority of the job associated with the transaction is adjusted so that the job (sometimes called a task or process) will be given increased access to CPU 105, which will allow it to complete earlier and thereby permit the removal of the associated JRO(s) from secondary storage. In the preferred embodiment, this adjustment is accomplished by scaling the original job priority by the estimated time to process the journal entries from the start of the commit cycle to current position in Journal 145. Note that in some cases the current or original job priority is higher than the adjusted priority, in which case the priority is not adjusted. Note also, that some transactions are carried out through the use of jobs on more than one computer system, meaning that more than one job may need to undergo priority adjustment to accomplish the goal of reduced memory utilization. In this later case, Commit Control Mechanism 150 of Computer System 100 would send a message (i.e., through network adapter 11) to a "sister" commit control mechanism on the other computer system at issue and request that a specified job have its priority adjusted (these steps are not shown).

The following psuedo code represents one way to implement the priority adjustment algorithm used in the preferred embodiment.

Job_Priority=MAX (current_priority, original_priority*
(current_sequence#-start_commit_sequence#)
*time_to_process_journal_ entry_for_commit/
acceptable _rollback_time)

time_to_process_journal_entry_for_commit is a system specific and assigned constant. acceptable_rollback_time is either a system or user specified constant identifying the preferred amount of time a rollback operation should consume. Another technique to achieve non-linear priority adjusts can be accomplished by defining a table which associates the number of entries which must be processed for the commit cycle with a priority adjustment value. A table lookup would then be used to acquire a priority adjustment delta that would be added to the current job priority. Note that both of these priority adjustment schemes accommodate the need to adjust the priority of a single transaction multiple times to deal with a chronic problem transaction.

Figure 3:
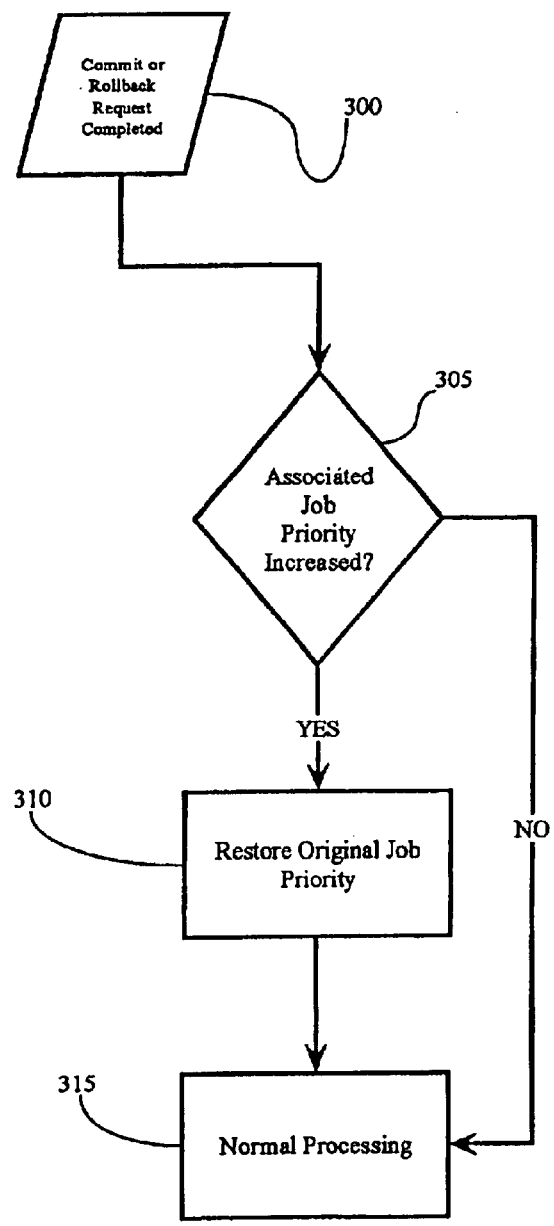

Once the job priority is adjusted, normal processing continues in block 225. Note here that the logic of FIG. 2 is iterative, meaning that multiple "old," storage consuming transactions are permitted to complete (commit) earlier, which makes for a better performing computer system. When a transaction completes, it is then necessary to restore adjusted priorities. FIG. 3 shows this logic. In block 300, a commit or rollback operation is signalled to Commit Control Mechanism 150. Commit Control Mechanism 150 then determines whether the job associated with the transaction has previously had its priority adjusted [block 305]. If so, the original priority of the job is restored [block 310] prior to resumption of normal processing [block 315]. If the priority of a job has not been adjusted, normal processing is simply resumed [see NO branch from block 305].

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A computer system, said computer comprising:
a bus;
a central processing unit;
computer system memory, said computer system memory being connected to said central processing unit; and
a memory management mechanism stored in said computer system memory, said memory management mechanism adjusting transaction priority to decrease transaction time and thereby permit more efficient journal space utilization by reducing allocated journal space.

2. The computer system of claim 1 wherein said memory management mechanism monitors elapsed time of outstanding transactions and selects an oldest transaction therefrom, said memory management mechanism then adjusting a priority of said oldest transaction so that said oldest transaction is able to complete processing more quickly.

3. The computer system of claim 2 wherein said memory management mechanism is a commit control mechanism.

4. The computer system of claim 2 wherein said transaction involves more than one job and wherein one of said more than one job executes on a first computer system and another of said jobs executes on a second computer system.

5. A program product, said program product comprising:
signal bearing medium; and
a memory management mechanism stored in said computer system memory, said memory management mechanism adjusting transaction priority to decrease transaction time and thereby permit more efficient journal space utilization by reducing allocated journal space.

6. The program product of claim 5 wherein said memory management mechanism monitors elapsed time of outstanding transactions and selects an oldest transaction therefrom, said memory management mechanism then adjusting a priority of said oldest transaction so that said oldest transaction is able to complete processing more quickly.

7. The program product of claim 5 wherein said memory management mechanism is a commit control mechanism.

8. The program product of claim 5 wherein said oldest transaction involves more than one job and wherein one of said more than one job executes on a first computer system and another of said jobs executes on a second computer system.

9. A computer implemented method, said method comprising the steps of:
receiving a journal related request; and
adjusting transaction priority to decrease transaction time and thereby permit more efficient journal space utilization by reducing allocated journal space.

10. The method of claim 9 wherein said adjusting step further comprises:
monitoring elapsed time of outstanding transactions;
selecting an oldest transaction from said outstanding transactions; and
adjusting a priority of said oldest transaction so that said oldest transaction is able to complete processing more quickly.

11. The method of claim 9 wherein said oldest transaction involves more than one job and wherein one of said more than one job executes on a first computer system and another of said jobs executes on a second computer system.

12. A computer implemented method, said method comprising the steps of:
receiving a journal related request;
adjusting transaction priority for a specific transaction to decrease transaction time of said transaction; and
deallocating memory associated with said specific transaction upon completion of said specific transaction.

13. The method of claim 12 wherein said adjusting step further comprises:

monitoring elapsed time of outstanding transactions;

selecting an oldest transaction from said outstanding transactions; and adjusting a priority of said oldest transaction so that said oldest transaction is able to complete processing more quickly.

14. The method of claim 12 wherein said oldest transaction involves more than one job and wherein one of said more than one job executes on a first computer system and another of said jobs executes on a second computer system.

* * * * *